United States Patent [19]

Lambert et al.

[11] 3,716,656

[45] Feb. 13, 1973

[54] COLOR TELEVISION SYSTEM FOR ELIMINATION OF PHASE ERRORS

[75] Inventors: François Lambert, Paris; Andrzej Bartosiak, 92 Meudon, both of France

[73] Assignee: Centre Electronique De France, Paris, France

[22] Filed: Feb. 3, 1971

[21] Appl. No.: 112,226

[52] U.S. Cl. ............................178/5.2 R, 178/5.4 C
[51] Int. Cl...........H04n 9/02, H04n 9/32, H04n 9/42
[58] Field of Search ...............178/5.4 R, 5.4 S, 5.2 R

[56] References Cited

FOREIGN PATENTS OR APPLICATIONS 1,061,885 3/1967 Great Britain......................178/5.4 S

OTHER PUBLICATIONS

"Sequential Receivers for French Color TV System," Electronics, May 6, 1960, pp. 57–60

"Colorful, Faithful, Easy to Operate: Goals for an All-European TV System," Electronics, March 22, 1965, pp. 97–108

"International Standards," IEEE Spectrum, March 1967, pp. 104–111

Color Television with Particular Reference to the PAL System, pp. 130–139

*Primary Examiner*—Robert L. Richardson
*Attorney*—Arnold Robinson

[57] ABSTRACT

A color television system in which two color difference signals are transmitted separately by modulating a sub-carrier with one signal during odd-numbered lines and the other during even-numbered lines, to avoid the adverse effects of phase errors.

A color burst is used as a marker for one of said signals, and is only transmitted during the relevant line periods. Code translators for producing such a signal from an NTSC signal are described, and also adaptors which enable NTSC receivers to function correctly with either an NTSC input or an input coded in accordance with the invention.

19 Claims, 13 Drawing Figures

COLOR TELEVISION SYSTEM FOR ELIMINATION OF PHASE ERRORS

The invention relates to color television systems. In numerous countries, the NTSC system is employed, in which there is simultaneous transmission of the luminance signal Y on one carrier and of a chrominance signal comprising two different components R - Y and B - Y, on a sub-carrier. Said sub-carrier is simultaneously amplitude-modulated by said two components, with respect to two mutually perpendicular axes (quadrature-modulation), and the carrier wave is suppressed. At the commencement of each line, during the suppression of the sub-carrier, a constant amplitude color burst signal at the frequency of said carrier is transmitted to provide a phase reference for the demodulation process.

The modulation axes of the components of the chrominance signal could be out of phase by 180° and 270° respectively, in relation to the modulation axis of the color burst, but in practice transmission is effected using the so-called "I" and "Q" axes, which are derived from the foregoing axes by rotation through + 33°. Conventional receivers normally effect demodulation in accordance with axes which are out of phase by 180° and 270° in relation to the modulation axis of the color burst, but de luxe receivers effect this demodulation operation in accordance with I and Q axes.

The NTSC television system gives excellent results where reception is good, but is subject to substantial chromatic degradation when the transmission link is of mediocre quality. It is particularly sensitive to phase different effects, as the color burst and the signal are transmitted at different instants, so that any relative error between the phase of the color burst and that of the signal leads to a corresponding error in the axes of projection of the chrominance vectors. The projection of the quadrature vector, which is zero in the case of correct phase, is added proportionally to the sine of the phase angle, this giving rise to a mixture of the two components and therefore to a color error.

One object of the present invention is to provide an improved color television system which substantially avoids chromatic distortions due to phase differences.

Another object of the invention is to provide an improved system as indicated hereinbefore, which is compatible with the NTSC system, so that a receiver designed to receive a transmission effected in accordance with the invention can likewise receive an NTSC coded transmission.

The invention consists in a color television system in which a luminance signal is transmitted on a carrier simultaneously with a chrominance signal consisting of two difference signals amplitude modulated on a sub-carrier with respect to two mutually perpendicular axes, the sub-carrier being suppressed, wherein a constant amplitude reference color burst at the frequency of the sub-carrier is only transmitted at the start of every second line, during which line modulation of the sub-carrier is effected by only a first of the difference signals, the second being suppressed, whilst during the odd-numbered lines only the second difference signal is transmitted, the first difference signal then being suppressed;

and wherein reception is effected using a permutating device synchronized to half the line-scan frequency said sub-carrier signal being supplied to two inputs of said permutating device with a delay difference between the two inputs, said delay being equal to the line-scan time, whereby the output of the permutating device combines the two components to give the chrominance vector which can then be decoded.

In this improved system, any phase difference error in reception cannot give rise to any modification of the color, since only one chrominance signal is transmitted per line. In contrast to the normal NTSC system, phase errors can only reduce the projection of the vector, and therefore the color saturation, and the human eye is relatively insensitive to this. The presence or absence of a color burst in a given line makes it possible to determine which modulating signal is being transmitted during that given time.

Another object of the present invention is to provide a coder for use in the implementation of the system hereinbefore described.

A coder constructed in accordance with the invention comprises a conventional circuit arrangement, with which those skilled in the art will be familiar, a matrix being provided to receive the primary color signals and produce a luminance signal and two difference signals based upon these signals, there also being provided a sub-carrier generator, a first phase-shift device for producing a phase shift of the sub-carrier in a first direction, a second phase-shift device for producing a phase shift of the sub-carrier in a second direction which is at 90° to the first, means for modulating the sub-carrier phase-shifted in the first direction by one difference signal and for modulating the sub-carrier phase-shifted in the second direction by the second difference signal, together with means for adding the modulated signals to the luminance signal, and is characterized by switching and adding means which effect the alternate addition to the luminance signal of the sub-carrier as phase-shifted in the first direction and modulated by the first difference signal during one line, and of the sub-carrier as phase-shifted in the second direction and modulated by the second difference signal during the following line.

Another object of the present invention is to provide a transcoder for producing a color coded signal suitable for the proposed system from an input signal having NTSC coded signals.

Said transducer or converter comprises in combination:- a sub-carrier separator; a sync. signal separator; a shaper circuit for producing line-scan frequency pulses from the sync. signals; a color burst gate controlled by the line-scan frequency pulses; a local oscillator tuned to the sub-carrier separator via the color burst gate and to the local oscillator via a loop circuit designed to keep the oscillator in phase with the reference phase determined by the color burst; a first phase shift device connected to the local oscillator and designed to produce a phase-shift in the sub-carrier in a first direction, this latter for example at an angle of 180° with respect to the axis of the sub-carrier produced by the oscillator; a second phase-shift device designed to phase-shift the sub-carrier in a second direction at an angle of 90° with respect to the first direction; a first synchronous amplitude demodulator connected to the sub-carrier separator and to the first phase-shift device in order to demodulate said sub-carrier in said first direction and thus produce one of said difference signals; and a second synchronous amplitude demodulator connected to the sub-carrier separator and to the second phase-shift device in order to demodulate said sub-carrier in said second direction and thus produce the second difference signal, and furthermore comprising a third phase-shift device for phase-shifting the sub-carrier in a third direction making an angle of 180° with respect to said first direction; a fourth phase-shift device for phase-shifting the sub-carrier in a fourth direction making an angle of 180° with respect to said second direction; means for modulating said sub-carrier phase-shifted in said third direction by said first difference signal and for modulating the sub-carrier phase-shifted in the fourth direction by said second difference signal; and switching and adding means for alternately adding to the incident signal the sub-carrier phase-shifted in said third direction and modulated by said first difference signal during one line, and the sub-carrier phase-shifted in the fourth direction and modulated by said second difference signal during the following line, in order to sequentially eliminate from the incident signal alternatively one component of the chrominance vector and then the other component thereof.

Yet another object of the present invention is to provide an adaptor by which a receiver intended for receiving an NTSC-coded color transmission can be used to receive a transmission coded in accordance with the system forming the subject of the present invention.

Said adaptor comprises in combination:— a delay line whose delay is equal to the duration of line-scan; a permutating device having two inputs for connection to the sub-carrier separator of an NTSC system receiver, one directly and the other via said delay line, said permutating device having outputs designed for connection to synchronous demodulators; means for controlling the permutating device through the medium of a line-scan flyback signal from said receiver; and means for restoring the phase of said control means, comprising a detector designed for connection to the color burst gate of the receiver and connected via a filter to a control circuit.

In the following, by way of non-limitative examples, a variety of methods of implementing the invention have been described making reference to the attached drawings in which.

Figures 1, 2, 3, 4:
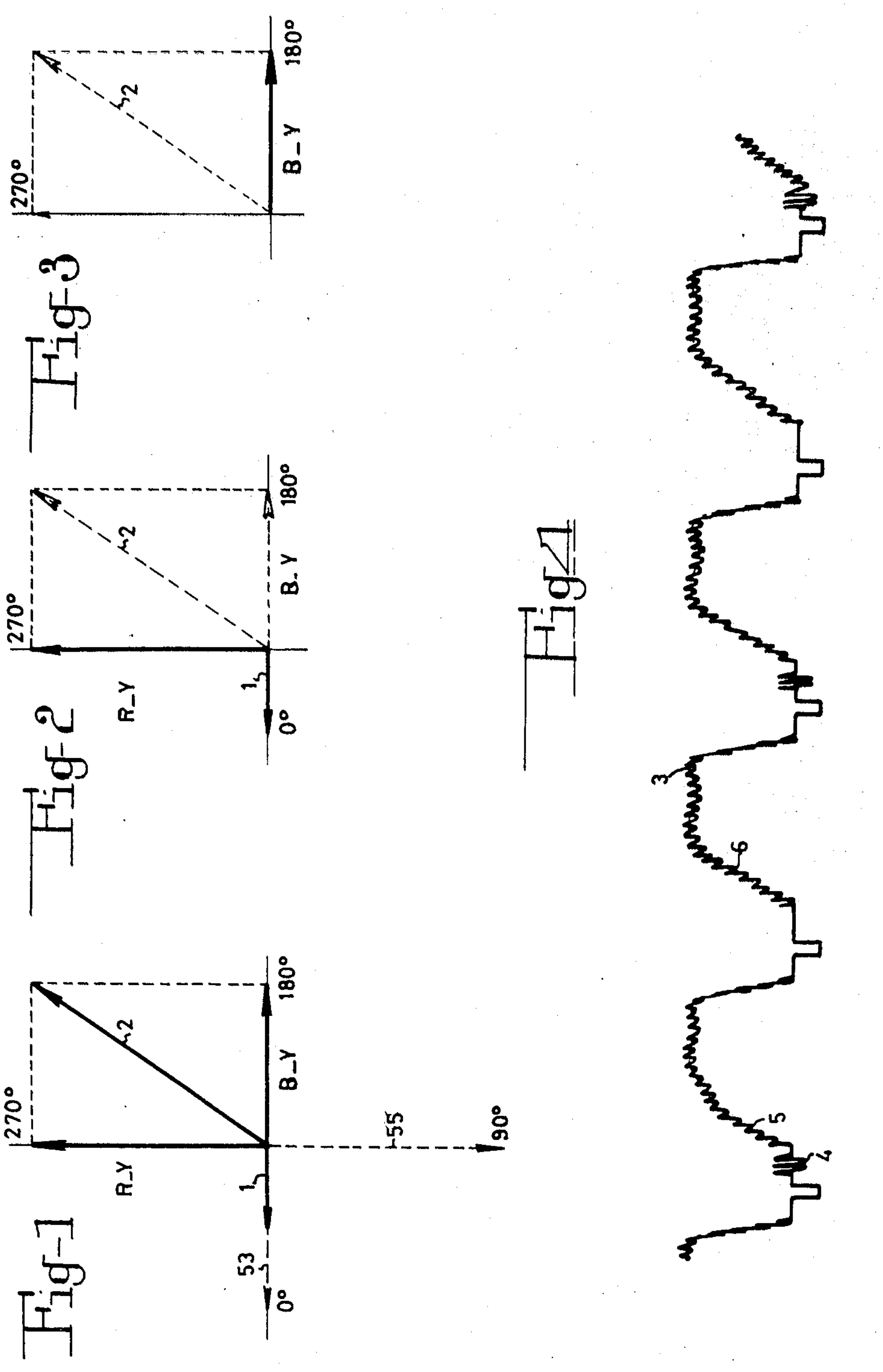
FIG. 1 is a vector diagram illustrating the chrominance signal employed in the NTSC system.
FIG. 2 is a vector diagram illustrating the chrominance signal used during even lines in one exemplary embodiment of a system in accordance with the invention.
FIG. 3 is a vector diagram illustrating the chrominance signal used during the odd lines in this embodiment of the invention.
FIG. 4 is a wave-form diagram illustrating the full signal obtained during several line-scan periods in this embodiment of the invention.

As indicated in FIG. 1, in the NTSC system a constant-amplitude color burst 1 at the frequency of the sub-carrier is transmitted with each line, the sub-carrier being amplitude-modulated by a first difference component R - Y and also by a difference component B - Y at a phase angle of 90° in relation to the first one. The two modulated signals together form the chrominance vector 2 whilst the sub-carrier itself is suppressed. In FIG. 1 the components are shown at angles of 180° and 270° with respect to the color burst, but other angles may be employed.

In the improved system proposed in accordance with the present invention, by contrast, the color burst 1 is only transmitted during alternate lines, for example at the start of each even-numbered line, during which the sub-carrier is amplitude-modulated exclusively by one of the modulating signals, for example the signal R - Y as shown in FIG. 2, to give the R - Y component of the chrominance vector 2, the component B - Y being suppressed together with the carrier, whilst during the odd-numbered lines modulation is exclusively by the B - Y signal as shown in FIG. 3.

FIG. 4 illustrates the waveform of the composite signal thus obtained during several line periods, the luminance signal 3 being supplemented by the sub-carrier which contains once every two lines the color burst 1 and the component R - Y, as indicated at 4 and 5 respectively, whilst the intervening lines contain the component B - Y, as indicated at 6.

At reception, after separation of the luminance signal, the chrominance signal is supplied to separate inputs of a permutating device synchronized to half the line-scan frequency, being fed directly to input and to the other via a delay line which introduces into the signal a delay equal to the duration of line-scan, that is to say around 63.49 microseconds in the case of a 525 line 60 c.p.s. standard. Thus, at the output of the permutating device there are simultaneously obtained the B - Y and R - Y components which can then be decoded in a manner used in conventional NTSC receivers, as will be described later.

Figure 5:
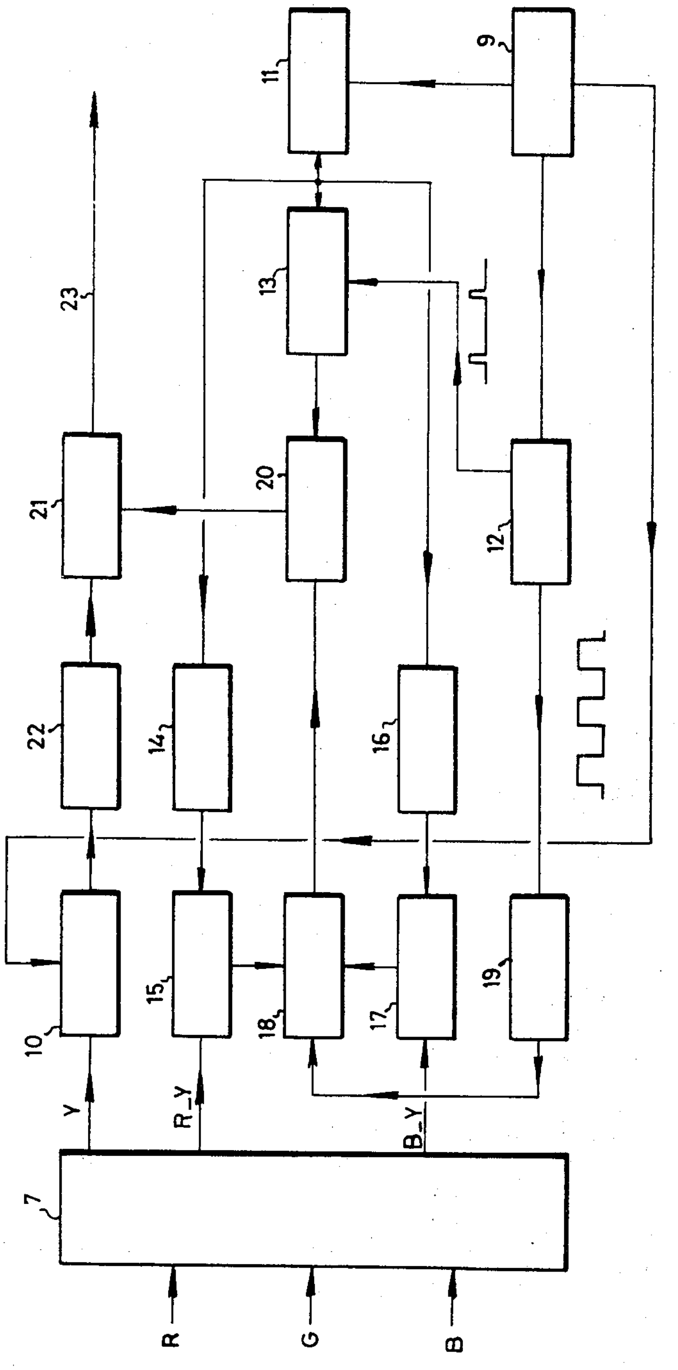
FIG. 5 is a block-schematic circuit diagram of one exemplary coder for producing color signals in a system in accordance with the invention.

FIG. 5 illustrates a coder for producing the modulated sub-carrier. A matrix 7 receives the three primary signal R, G and B and produces from these primary signals the luminance signal Y and two difference signals R -Y and B - Y.

A sync. generator 9 of the conventional type used in NTSC coders produces a sequence of sync. signals, in particular of the kind known as "mixed syn.", the "- black line" and "black frame" signals, which are then added to the luminance signal Y by an adder 10. This generator 9 also controls a reference sub-carrier generator 11, as well as a shaper circuit 12 producing pulses at half the line scan frequency together with a rectangular waveform signal likewise of half the line-scan frequency. A color burst gate 13 is connected to the generator 11 and is controlled by the pulse train from the shaper circuit 12 to produce a color burst of sub-carrier frequency every other line, at start of each line containing the R - Y signal.

The generator 11 is connected to the input of a phase-shift device 14 which introduces a 270° phase shift into the reference sub-carrier and whose output is connected to a balance modulator 15 also supplied with the signal R - Y. Said generator is likewise connected to the input of a phase-shift device 16 which produces a 180° phase shift in the reference sub-carrier and whose output is connected to a balance modulator 17 receiving the signal B - Y. In the conventional NTSC system the modulated signals coming from the modulators 15 and 17 would be added to one another, but instead the modulators 15 and 17 are connected to the two inputs of a switch or double gate 18 which is under the control of a trigger stage 19 operated by the rectangular waveform signal from the shaper circuit 12, and thus furnish a sequential signal which during one line has the modulated signal B - Y and during the next line has the modulated signal R - Y.

An adder 20 has respective inputs connected to the color burst gate 13 and to the switch 18, so that the color burst is added to the modulated signal R - Y. A second adder 21 has respective inputs connected to the output of the adder 20 and via a delay line 22 to the output of the adder 10. In this fashion, at the output 23 of the adder 21 the full signal illustrated in FIG. 4 is obtained.

Figure 6:
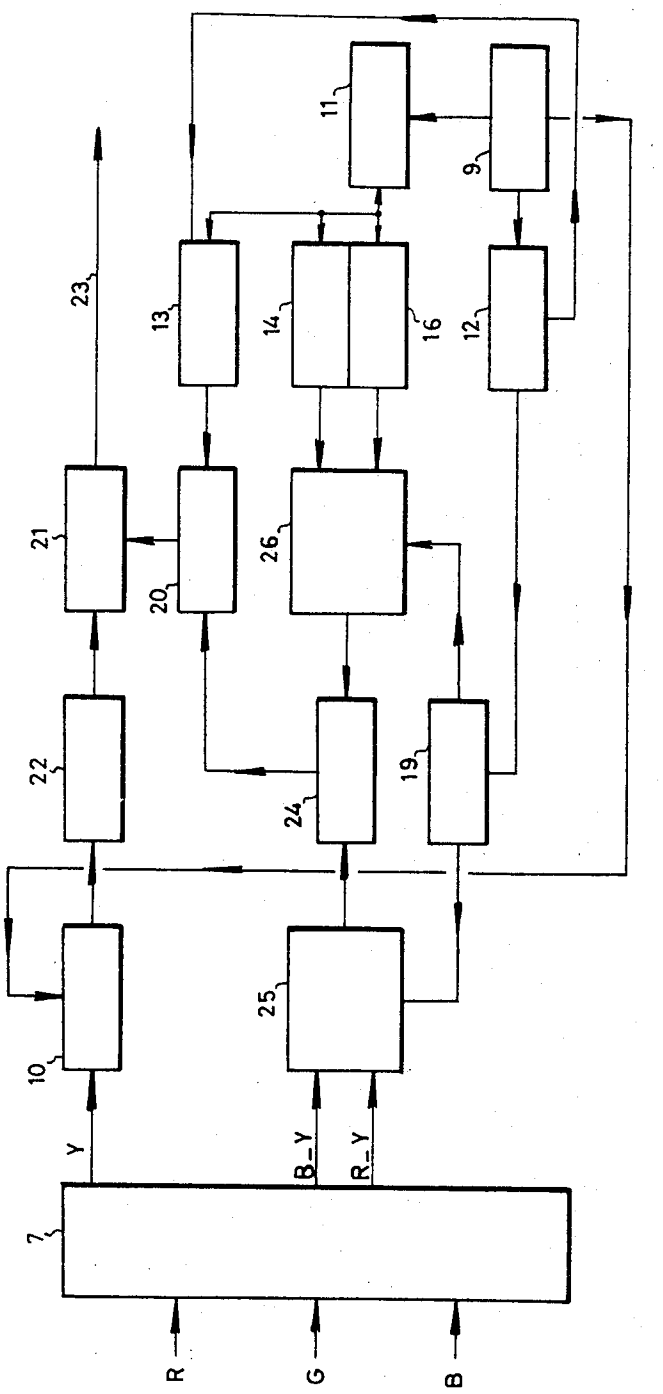
FIG. 6 illustrates one variant embodiment of a coder.

FIG. 6 illustrates a variant embodiment of the coder shown in FIG. 5, which requires only one modulator 24, with respective inputs connected to the outputs of two switches or double gates 25 and 26, each controlled by a trigger stage 19. The respective inputs of the switch 25 receive the signals R - Y and B - Y whilst the respective inputs of the switch 26 are connected to the phase-shift devices 14 and 16, so that at the output of the modulator 24 there is obtained during one line the signal R - Y as modulated by the sub-carrier which has been phase-shifted by 270°, and during the following line, the signal B - Y as modulated by the sub-carrier which has been phase-shifted by 180°.

The output of the modulator 24 is connected to the adder 20 at the same time as the gate 13, and the full signal is obtained at 23, as described with reference to FIG. 5.

Figure 7:
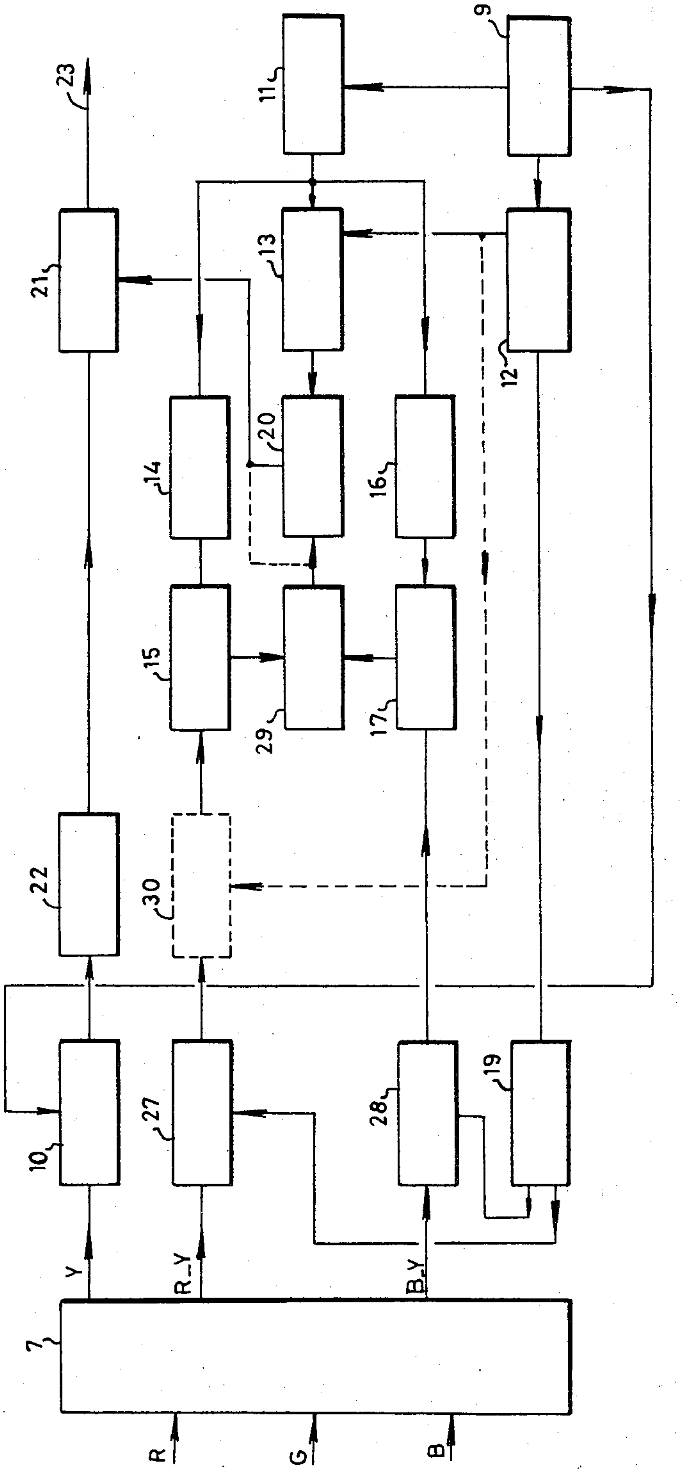
FIG. 7 illustrates yet another variant embodiment of a coder.

FIG. 7 illustrates another variant embodiment of the coder shown in FIG. 5, which employs two modulators 15 and 17, each preceded by a device, 27 and 28 respectively, for blocking the modulating signal. Each blocking device is supplied with one of the modulating signals and controlled by a respective rectangular waveform signal from the trigger stage 19, these two latter signals being in antiphase with one another. For example, during the positive alternation of a rectangular waveform signal, the modulating signal disappears from the output of the corresponding blocking device (27 or 28 as the case may be), so that the output signal from the particular balance modulator which follow then drops to zero. At the same time, the other modulating signal acts normally upon the other balance modulator. The two balance modulators 15 and 17 are each connected to a respective input of an adder 29, whose output is connected to the input of the adder 20 in which the reference marker produced by the color burst gate 13 is added. The full signal appears at 23. It should be underlined that in the variant embodiment of the coder illustrated in FIG. 7, the reference marker can be produced in another manner, for example by adding a pulse in the channel carrying the modulating signal B - Y by means of an adder 30 located after the blocking device 27, as shown in broken line fashion. Said pulse, whose position and duration correspond to the reference marker should appear once every two lines, during the particular lines in which the signal B - Y is blocked in this embodiment. When this arrangement is employed, the color burst gate 13 and the adder 20 can be dispensed with, and the modulating pulse train from the shaper device 12 applied to the adder 30, whilst the signal from the adder 29 is supplied directly to the adder 31.

Instead of initially coding the difference signals, it may sometimes be simpler to form the required signal from a composite signal of the NTSC type, that is to say a signal simultaneously comprising the two components B - Y and R - Y in quadrature.

Figure 8:
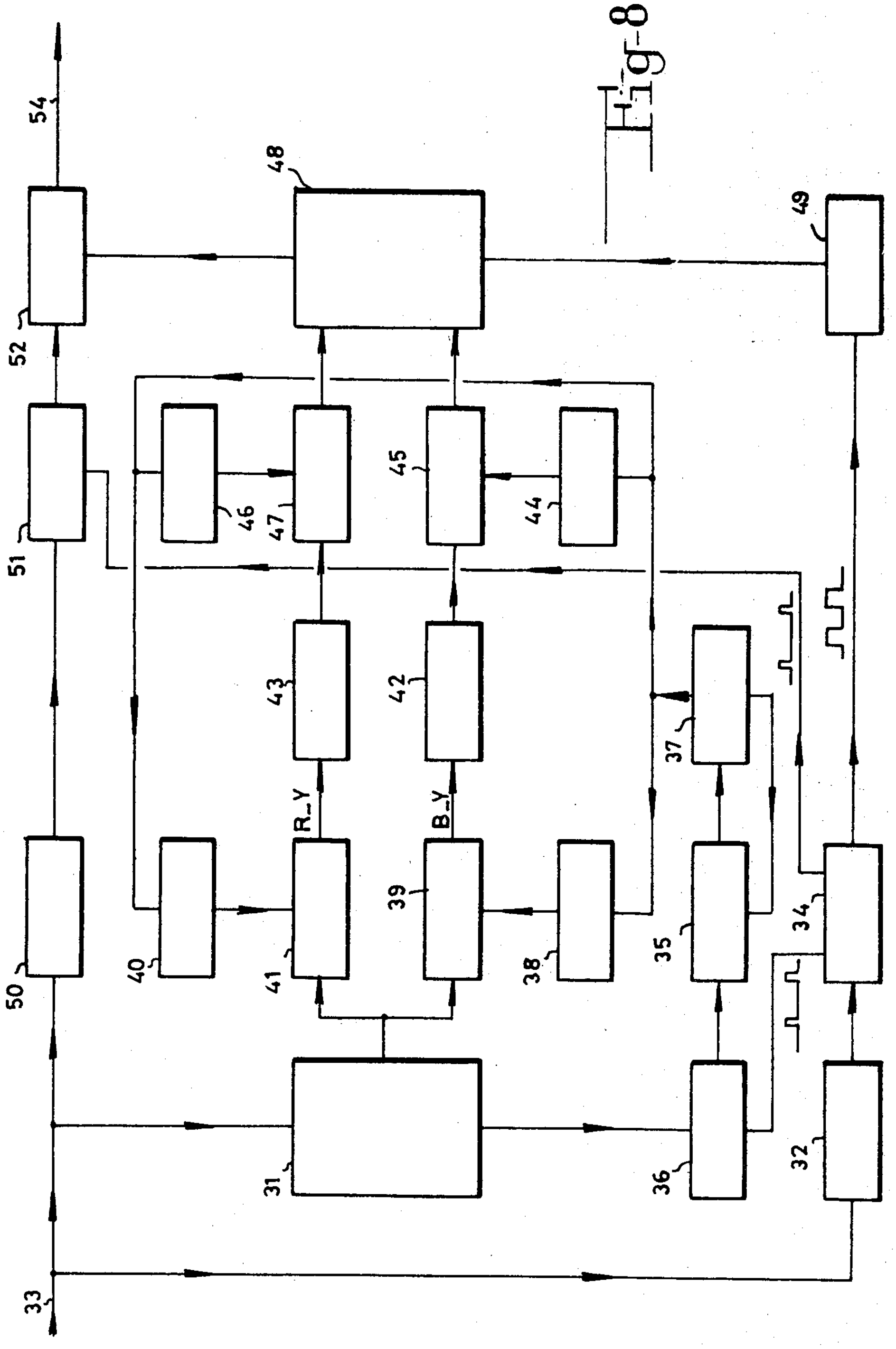
FIG. 8 is a block-schematic diagram of one exemplary transcoder for converting an NTSC signal into a color signal in accordance with the invention.

FIG. 8 illustrates an exemplary transcoder designed for this purpose, in which the components B - Y and R - Y of the rotating chrominance vector are sequentially suppressed in alternate fashion by the addition of a corresponding component of equal but opposite amplitude. This transcoder comprises a sub-carrier separator 31 and a sync. separator 32, to which the NTSC signal 33 is applied. The separator 32 isolates the sync. signals and supplies them to a shaper circuit 34 producing a pulse train at line scan frequency, a pulse train at half line-scan frequency, and a rectangular waveform signal at half the line-scan frequency.

The output of the sub-carrier separator 31 is connected to a phase comparator 35 via a color burst gate 36 which is controlled by line-scan frequency pulse train from the shaper circuit 34, and thus solely allows the color burst of the incident signal to pass. The phase comparator 35 is connected in a loop circuit to a local oscillator 37 which regenerates the sub-carrier, and keeps said oscillator in phase with the reference phase transmitted in the color burst.

The local oscillator 37 is connected via a phase-shift device 38 which shifts the phase of the sub-carrier through 180° to a synchronous demodulator 39 that is also supplied with the modulated sub-carrier coming from the separator 31. Said local oscillator is likewise connected via a phase-shift device 40 which shifts the phase of the sub-carrier through 270° to a synchronous demodulator 41 likewise supplied with the modulated sub-carrier. The outputs of the demodulators 39 and 41 are connected respectively to low-pass filters 42 and 43 which are designed to rid the signals of the residual sub-carrier, and at the outputs of these filters the signals B - Y and R - Y appear. The assembly of elements described hitherto with reference to FIG. 8 constitutes an NTSC decoder.

The local oscillator is likewise connected via a 0° phase-adjusting circuit 44 to a balanced modulator 45 receiving the B - Y signal from the filter 42, and via a phase-shift device 46 which produces a 90° phase-shift in the sub-carrier to a balance modulator 47 receiving the R - Y signal from the filter 43. The outputs of the modulators 45 and 47 are connected to a switch or double gate 48 which is controlled by a trigger stage 49, itself operated by the rectangular waveform signal from the shaper circuit 34.

A delay line 50, designed to restore coincidence between the incident signal and those having a narrow passband, receives the NTSC signal arriving at 33 and transmits it to a gate 51 which is normally open but closes under the effect of the pulse train of half line-scan frequency coming from the shaper circuit 34, so that all that is passed is the whole chrominance signal and one marker 1 in every two. An adder 52 has its inputs connected to the gates 48 and 51.

The signal arriving at the input 33 comprises simultaneously, and for every line, the two components B - Y and R - Y of the chrominance signal 2, together with color bursts 1 as shown in FIG. 1.

During even-numbered lines the gate 51 remains open, so that the color burst 1 is transmitted, and in addition the switch 48 connects the output of the modulator 45 to the adder 52 so that there is added to the incident signal a signal 53 (FIG. 1) which has the same amplitude as the component B - Y but is in antiphase with the component B - Y of the incident signal 33. This latter component is thus suppressed and the signal at the output 54 of the adder 52 during the even lines contains the color burst 1 and the component R - Y as shown in FIG. 2.

During the odd-numbered lines, the gate 51 closes to block the color burst 1 so that the latter is suppressed, and the switch 48 connects the adder 52 to the modulator 47, so that a signal 55 (FIG. 1) which has the same amplitude as the component R - Y but the opposite sense is added to the incident signal. This latter component is thus suppressed and the output signal at 54 simply contains the component B - Y, as shown in FIG. 3.

Thus, after this transcoding or conversion, the resultant signal has the form shown in FIG. 4.

It will be observed that the luminance signal is not affected by the transcoder since the latter contains no filters for eliminating the sub-carrier, and therefore the black and white definition is maintained. Moreover, thanks to the use of the same sub-carrier as the incident sub-carrier beat phenomena are eliminated.

Figure 9:
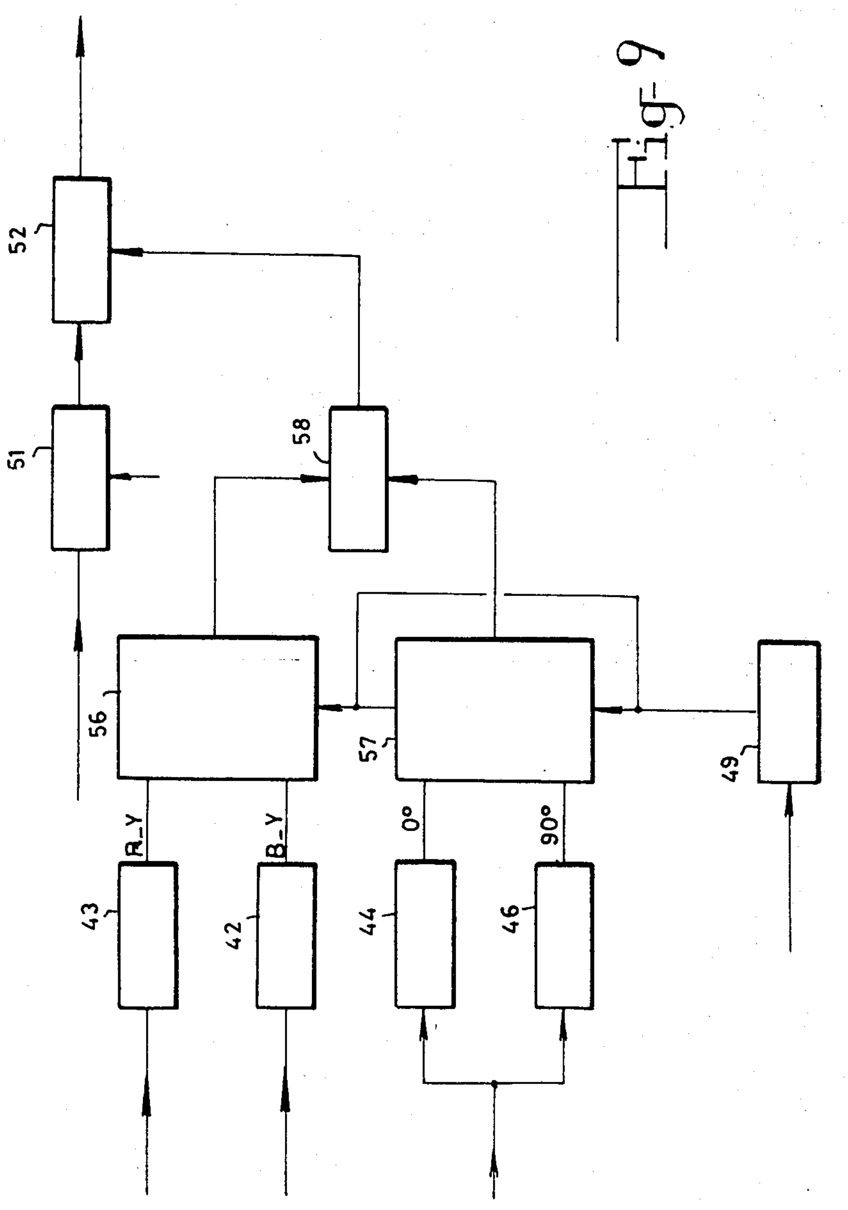
FIG. 9 illustrates a modified form of the transcoder shown in FIG. 8.

In the variant embodiment shown in FIG. 9, the right hand portion of FIG. 8 is replaced by a modified arrangement, in which two switches 56 and 57 are provided, both controlled by the trigger stage 49. The inputs of the first switch 56 are connected to the filters 42 and 43, whilst those of the second switch 57 are connected to the 0° phase-adjusting circuit 44 and to the phase-shift device 46. A balanced amplitude modulator 58 is connected to the switches 56 and 57 in order to modulate the sub-carrier phase-shifted by 90° with the signal coming from the filter 42, and to modulate the sub-carrier phase-shifted by 0° with the signal coming from filter 43. The output of the modulator 58 is connected to the adder 52.

During the even lines, the switches 56 and 57 connect the modulator 58 respectively to the filter 42 and to the circuit 44, so that the modulator produces the signal 53 (FIG. 1) which is of the same amplitude as the component B - Y and is in antiphase with the phase of the corresponding component in the incident signal. By contrast, during the odd lines, this modulator is connected to the filter 43 and to the phase-shift device 46 so that it produces the signal 55 (FIG. 1) of the same amplitude as the component R - Y and in antiphase with the component R - Y the incident signal. The final result is the same as that obtained using the transcoder of FIG. 8.

Figure 10:
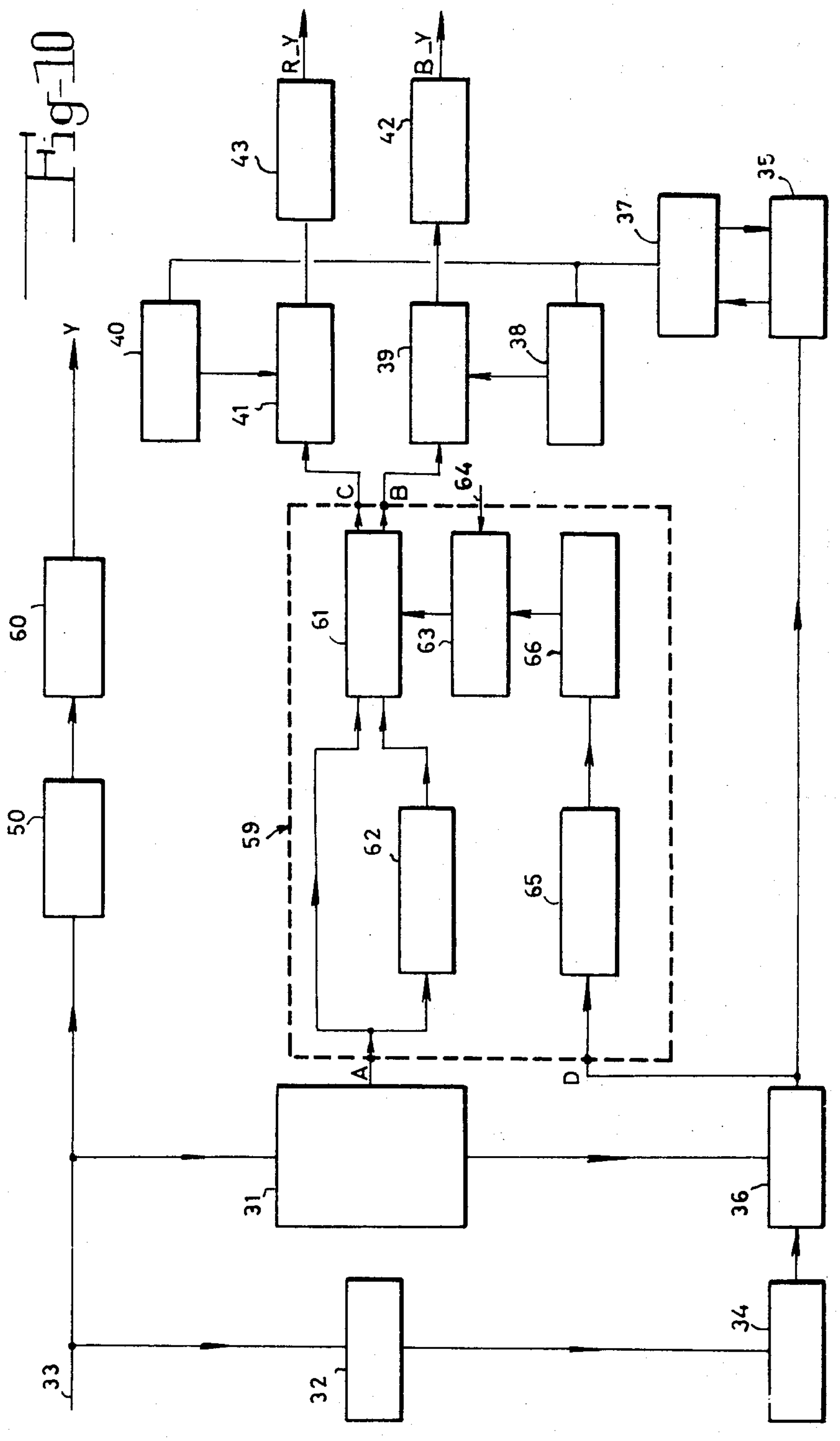
FIG. 10 is a block-schematic diagram of part of an NTSC receiver equipped with an exemplary embodiment of an adaptor for implementing the invention.

FIG. 10 illustrates the parts of a receiver used for decoding the composite signals, which comprises an NTSC decoder of conventional design, together with an adaptor 59, shown within a broken-line rectangle.

The NTSC decoder is of the kind shown in FIG. 8, in which decoding is effected by projecting the chrominance vector onto the axes R - Y and B - Y and contains the described arrangement of the sub-carrier separator 31, the sync. signal separator 32, the shaper circuit 34, the phase-comparator 35, the color burst gate 36, the local oscillator 37, the phase-shift devices 38 and 40, the synchronous demodulators 39 and 41 with their filters 42 and 43, and the delay line 50, to which a filter 60 tuned to the frequency of the sub-carrier has been added in order to eliminate said sub-carrier.

The adaptor 59 is connected at the points A, B and C between the sub-carrier separator 31 and the demodulators 39 and 41. It is connected at D to the color burst gate 36.

This adaptor comprises a permutating device 61 whose inputs are connected via point A, to the output of the sub-carrier separator 31, one input being directly connected and the other via a delay line 62 introducing a delay corresponding to the line-scan time, that is to say around 63.49 μsec. in the case of a 525 line 60 c.p.s. standard. The outputs of the permutating devices are connected via the points B and C respectively to the demodulators 39 and 41.

The permutating device 61 is controlled by a trigger stage 63 producing rectangular waveform signals of half line-scan frequency, triggered itself by line-scan flyback pulses applied to an input 64 from the receiver circuit, so that the permutating device changes state with each line flyback. A detector 65 is connected via the point D to the color burst gate 36, and produces a pulse train at half the line-scan frequency, the pulses being filtered by a filter 66 and applied to ensure that the trigger stage 63 is set to the correct phase in accordance with the parity of the lines.

Figure 11:
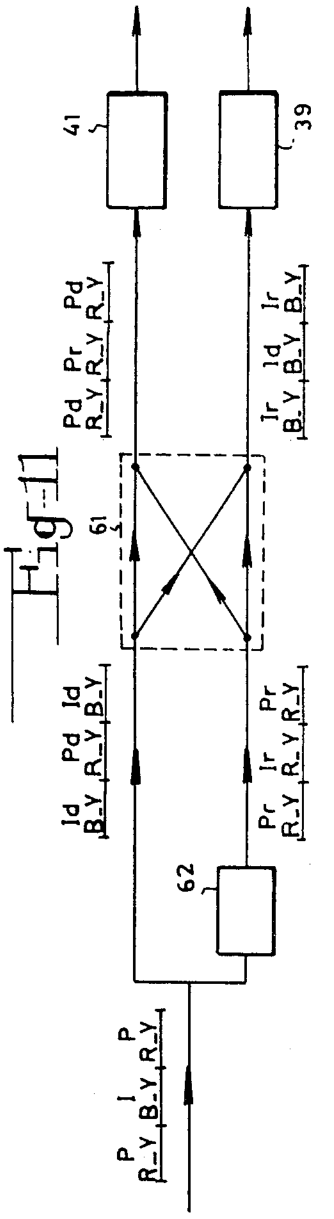
FIG. 11 is an explanatory diagram illustrating the operating of the adaptor shown in FIG. 10 when receiving a color signal in accordance with the invention.

FIG. 11 illustrates the operation of the adaptor 59 when receiving signals coded in accordance with the invention. The sub-carrier arriving at the input A of the adaptor 59 is modulated by the component R - Y of the chrominance signal during the even lines (P), and by the component B - Y during the odd lines (I). Since the delay introduced by the delay line 62 is exactly equal to the duration of line-scan, the permutating device is fed simultaneously with the sub-carrier corresponding to the scanned points in a line (Id or Pd) and by the sub-carrier corresponding to the same point in the preceding line (Pr or Ir). Thus, at any instant we simultaneously have the two components B - Y and R - Y. The permutating device 61, operated at half the line-scan frequency, switches the signal inputs so that the sub-carrier modulated by the component R - Y is always sent to the demodulator 41 whilst the sub-carrier modulated by B - Y is always supplied to the demodulator 39. In this fashion, the difference signals B - Y and R - Y are obtained at the output of the filters 42 and 43.

As the presence of a color burst is characteristic of a line in which the sub-carrier is modulated by the component R - Y, the pulses resulting from the detection of the color bursts maintain the permutating device 61 in phase, so ensuring that the sub-carrier modulated by the component R - Y is not sent to the demodulator 39 and that that modulated by the component B - Y is not sent to the demodulator 41, since otherwise the difference signals could not be produced.

Figure 12:
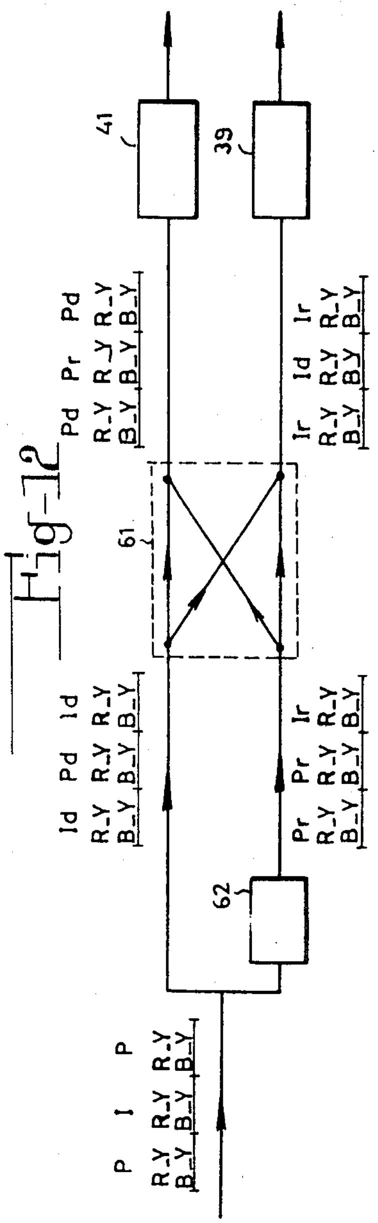
FIG. 12 is an explanatory diagram illustrating the operation of the adaptor shown in FIG. 10, when receiving an NTSC-coded transmission.

The adaptor 59 does not interfere with the operation of the receiver when it receives an NTSC-coded transmission, as shown in FIG. 12. In this case the sub-carriers passing through the direct channel and through the delay channel both contain the two modulations R - Y and B - Y in quadrature and the points B and C receive the same signals as those arriving at A. The vertical chromatic definition is halved, but since information in this direction is superfluous, this does not result in any subjected impairment of the picture quality.

In the case of receivers in which decoding is not effected in accordance with the axes of the vectors B - Y and R - Y, but in accordance with two different axes, for example the axes "I" and "Q" which makes an angle of 33° with the former, the adaptor 59 will not operate satisfactorily because it is necessary to provide, at the receiver input, a quadrature-modulated signal in accordance with the NTSC system.

Figure 13:
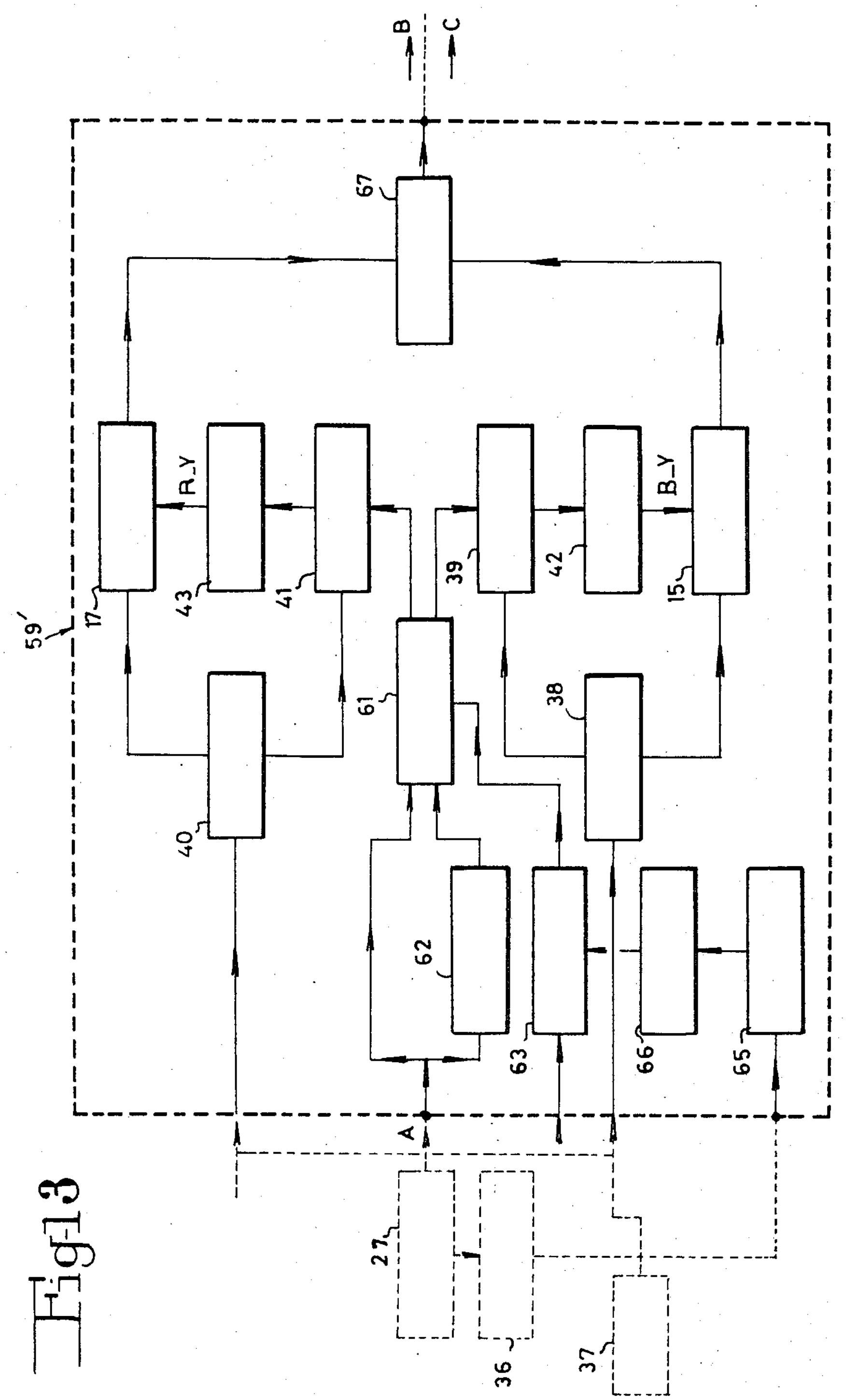
FIG. 13 is a block-schematic diagram of one variant embodiment of an adaptor in accordance with the invention.

In this case, an adaptor such as the adaptor 59' shown in FIG. 13 is used. This comprises the same elements as the adaptor 59 described with reference to FIG. 10, but includes in addition a phase-shift device 38 which is designed for connection to the local oscillator 37 of the receiver and which produces a phase-shift of 180° in the subcarrier, a synchronous demodulator 39 which is connected to the phase-shift device 38 and to the permutating device 61, a low-pass filter 42 at whose output the B - Y component is picked up, a phase-shift device 40 which is also designated for connection to the local oscillator 37 and which produces a phase-shift of 270° in the sub-carrier, a synchronous demodulator 41 which is connected to the phase-shift device 40 and to the permutating device 61, and a low-pass filter 43 at the output of which the R - Y signal is picked up. The adaptor, finally, comprises a balanced modulator 15 connected to the filter 42 and to the phase-shift device 38, a balanced modulator 17 connected to the filter 43 and to the phase-shift device 40, and an adder 67 connected to the modulators 15 and 17. When the adaptor is connected to a receiver, the output of the adder 67 will be connected to the synchronous demodulators of said receiver.

At the output of the adder 67, a complete NTSC signal is obtained, but this signal contains no phase error, which would not be the case if the adder 67 were connected directly to the outputs of the permutating device 61.

It is evident from the foregoing description that the method and devices forming the subject of the present invention make it possible to eliminate distortions of phase difference origin, often present in the case of an NTSC-coded transmission. A residue of one of the components of the chrominance vector, in a line modulated by the other chrominance vector has virtually no adverse effect. For example, if we consider a line modulated by the component B - Y, with a residual proportion of 10 percent of the component R - Y and with a phase error of 10°, sufficient to give rise to modifications in shading which could be extremely marked in an NTSC-coded transmission, the disturbing signal added has a value equal to 0.1 × sin 10° × (R-Y), that is to say to 0.017 (R-Y) and is consequently absolutely invisible in the proposed system. The invention thus achieves a spectacular improvement in protection against phase error, compared with the NTSC system.

In addition, transcoding is an easy matter to carry out; the adaptors are simple, inexpensive and can be fitted to all receivers designed for receiving NTSC system signals, whatever the decoding axes chosen for the receiver. Finally, a receiver equipped with an adaptor can receive an NTSC-coded transmission without any requirement for switching.

It does without saying that the invention is not limited to the embodiments described and illustrated here, but embraces all the possible variant forms.

What we claim as our invention and desire to secure by letters patent of the United States is :-

1. A color television system operative to provide a composite television signal from three primary signals and operative to work on a received chrominance signal; said composite signal being made up of a luminance signal on a carrier and said chrominance signal; said chrominance signal being made up of two difference signals amplitude modulated on a sub-carrier with respect to two mutually perpendicular axes and a constant amplitude reference color burst at the frequency of the sub-carrier, said two differance signals being absent at the start of every second line when said color burst is present, the first of said difference signals being present while the second of said two differance signals is absent during odd-numbered lines, and said second differance signal being present while said first differance signal is absent during even-numbered lines; said system comprising:

first means operative to receive said three primary signals and to generate said luminance signal on a carrier and said two differance signals;

second means operative to receive said two differance signals and said luminance signal and to generate said chrominance signal, said second means being further operative to provide phase angle separation between said two amplitude modulated difference signals and to effect surpression of each of said two amplitude modulated signals singly and simultaneously, and to combine said luminance and chromiance signals; and third means operative to receive said chrominance signal and to effect a time delay between said amplitude modulated differance signals and to combine said two amplitude modulated differance signals so that both of said amplitude modulated differance signals which are transmitted on alternate lines are present during each line.

2. The color television system according to claim 1 wherein: said first means comprise a matrix to which primary color input signals are supplied and which produces a luminance signal and two difference signals based upon these input signals; said second means comprise a sub-carrier generator, a first phase-shift device for producing a phase shift of the sub-carrier in a first direction, a second phase-shift device for producing a phase shift of the sub-carrier in a second direction which is at 90° to the first, means for modulating the sub-carrier phase-shifted in the first direction by one of said difference signals and for modulating the phase-carrier phase-shifted in the second direction by the second difference signal; means for adding the modulated signals to the luminance signal , said means comprising switching and adding means which effect the alternate addition to the luminance signal of the sub-carrier phase-shifted in the first direction and modulated by the first difference signal during one line, and of the sub-carrier phase-shifted in the second direction and modulated by the second difference signal during the following line.

3. The color television system according to claim 2 wherein said means for modulating said sub-carrier comprise a first modulator for amplitude-modulating the sub-carrier as phase-shifted in the first direction with one of said difference signals, a second modulator for amplitude modulating the sub-carrier as phase-shifted in the second direction, a switch or double gate whose inputs are connected to the modulators, an adder having one input connected to the output of the switch and its other input connected to the source of said reference color burst, and means for controlling the switch at half the line-scan frequency.

4. The color television system according to claim 2, wherein said means for modulating said sub-carrier further comprise a first switch whose inputs receive the difference signals, a second switch whose inputs are connected to two phase-shift devices, a modulator whose inputs are connected to the outputs of the two switches, and means for controlling the two switches at half the line-scan frequency, and said second means further comprise an adder having one input supplied by the color burst signal and its other input connected to the output of the modulator.

5. The color television system according to claim 4, wherein said second means further comprise a color burst gate the input of which is connected to said sub-carrier generator, a second adder which receives at one input said luminance signal and at the other input said color burst signal and said chrominance signal, means being provided for supplying opening pulses to said color burst gate at half the line-scan frequency.

6. The color television system according to claim 2, wherein said second means further comprise means for alternately blocking said modulating difference signals during successive line-scan periods.

7. The color television system according to claim 6 wherein said second means further comprises an adder to add to at least one of said modulating difference signals a pulse of half line-scan frequency whose duration and position determine the reference marker color burst.

8. The color television system according to claim 1 wherein said third means comprise a delay line whose delay is equal to the duration of line-scan; a permutating device having two inputs for connection to the sub-carrier separator of an NTSC receiver, one directly and the other via said delay line, said permutating device having outputs designed for connection to synchronous demodulators; means for controlling the permutating device through the medium of a line-scan flyback signal from said receiver; and means for restoring the phase of said control means, comprising a detector designed for connection to the color burst gate of the receiver and connected via a filter to a control circuit.

9. The color television system according to claim 8 wherein said third means further comprise a phase-shift device designed for connection to the local oscillator of the receiver and producing a phase-shift of the sub-carrier in the first direction; a second phase-shift device likewise designed for connection to the local oscillator; a first synchronous amplitude demodulator having one input connected to one of the outputs of the permutating device and a second input connected to the first phase-shift device in order to produce one of the components of the chrominance signal; a second synchronous amplitude demodulator having one input connected to the other output of the permutating device and a second input connected to the second phase-shift device in order to furnish the other component of the chrominance signal; a first balanced modulator whose inputs are connected to the first phase-shift device and to the first demodulator; a second balanced modulator whose inputs are connected to the second phase-shift device and to the second demodulator; and an adder whose inputs are connected to the two modulators and whose output is designed for connection to the synchronous demodulators of the receiver.

10. A color television system operative to provide a composite television signal from a composite NTSC signal, and operative to work on a receiver chrominance signal; said composite television signal being made up of a luminance signal on a carrier and said chrominance signal; said chrominance signal being made up of two differance signals amplitude modulated on a sub-carrier with respect to two mutually perpendicular axes and a constant amplitude reference color burst at the frequency of the sub-carrier, said two differance signals being absent at the start of every second line when said color burst is present, the first of said differance signals being present while the second of said two differance signals is absent during odd-numbered lines, and said second differance signal being present while said first differance signal is absent during even-numbered lines; said system comprising:

first means operative to receive said composite NTSC signal and to generate said chrominance signal;

second means operative to combine said composite NTSC signal with said chrominance signal to provide said composite television signal; and third means operative to receive said chrominance signal and to effect a time delay between said amplitude modulated differance signals and to combine said two amplitude modulated differance signals so that both of said two amplitude modulated differance signals which are transmitted on alternate lines are present during each line.

11. A color television system according to claim 10 wherein said first means comprise a sub-carrier separator, a sync. signal separator; a shaper signal for producing line-scan frequency pulses from the sync. signals; a color burst gate controlled by the line-scan frequency pulses; a local oscillator tuned to the sub-carrier frequency; a phase comparator connected to the sub-carrier separator via the color burst gate and to the local oscillator via a loop circuit designed to keep the oscillator in phase with the reference phase determined by the color burst; a first phase-shift device connected to the local oscillator and designed to produce a phase-shift in the sub-carrier in a first direction, this latter for example making an angle of 180° with respect to the axis of the sub-carrier produced by the oscillator; a second phase-shift device designed to phase-shift the sub-carrier in a second direction at an angle of 90° with respect to the first direction; a first synchronous amplitude demodulator connected to the sub-carrier separator and to the first phase-shift device in order to demodulate said sub-carrier in said first direction and thus produce one of said difference signals; and a second synchronous amplitude demodulator connected to the sub-carrier separator and to the second phase-shift device in order to demodulate said sub-carrier in said second direction and thus produce the second difference signal; and further comprising a third phase-shift device for phase-shifting the sub-carrier in a third direction making an angle of 180° with respect to said first direction; a fourth phase-shift device for phase-shifting the sub-carrier in a fourth direction making an angle of 180° with respect to said second direction; means for modulating said sub-carrier phase-shifted in said third direction by the said first difference signal and for modulating the sub-carrier phase-shifted in the fourth direction by said second difference signal; and wherein said second means comprise switching and adding means for alternatively adding to the incident signal the sub-carrier phase-shifted in said third direction and modulated by said first difference signal during one line, and the sub-carrier phase-shifted in the fourth direction and modulated by said second difference signal during the following line, in order to sequentially eliminate from the incident signal alternatively one component of the chrominance vector and then the other component thereof.

12. The color television system according to claim 11 wherein said first means further comprises a first balanced modulator for amplitude-modulating the sub-carrier phase-shifted in the third direction with the first difference signal; a second balanced modulator for amplitude-modulating the sub-carrier phase-shifted in the fourth direction; a switch or double gate whose inputs are connected to the modulators; and said second means further comprise an adder having one input supplied with the incident signal and its other input connected to the output of the switch and means for controlling the switch at half the line-scan frequency.

13. The color television system according to claim 10 wherein said first means further comprise a first switch whose inputs receive the difference signals; a second switch whose inputs are connected to the two phase-shift devices; a modulator whose inputs are connected to the out-puts of the two switches; and said second means further comprise an adder one input of which receives the incident signal whilst its other input is connected to the output of the modulator; and means for controlling the two switches at half the line-scan frequency.

14. A color television system according to claim 10 wherein said first means comprise a color burst blocking gate arranged to receive said NTSC signal, and means for supplying closing pulses to said gate at half the line-scan frequency.

15. The color television system according to claim 10 wherein said third means comprise a delay line whose delay is equal to the duration of line-scan; a permutating device having two inputs for connection to the sub-carrier separator of an NTSC receiver, one directly and the other via said delay line, said permutating device having outputs designated for connection to synchronous demodulators; means for controlling the permutating device through the medium of a line-scan flyback signal from said receiver; and means for restoring the phase of said control means, comprising a detector designed for connection to the color burst gate of the receiver and connected via a filter to a control circuit.

16. The color television system according to claim 15 wherein said third means further comprises a phase-shift device designed for connection to the local oscillator of the receiver and producing a phase-shift of the sub-carrier in the first direction; a second phase-shift device likewise designed for connection to the local oscillator; a first synchronous amplitude demodulator having one input connected to one of the outputs of the permutating device and a second input connected to the first phase-shift device in order to produce one of the components of the chrominance signal; a second synchronous amplitude demodulator having one input connected to the other output of the permutating device and a second input connected to the second phase-shift device in order to furnish the other component of the chrominance signal; a first balanced modulator whose inputs are connected to the first phase-shift device and to the first demodulator; a second balanced modulator whose inputs are connected to the second phase-shift device and to the second demodulator; and an adder whose inputs are connected to the two modulators and whose output is designed for connection to the synchronous demodulators of the receiver.

17. A color television system operative to provide a composite television signal from three primary signals; said composite signal being made up of a luminance signal on a carrier and a chrominance signal; said chrominance signal being made up of two differance signals amplitude modulated on a sub-carrier with respect to two mutually perpendicular axes and a constant amplitude reference color burst at the frequency of the sub-carrier, said two differance signals being absent at the start of every second line when said color burst is present, the first of said difference signals being present while the second of said two differance signals is absent during odd-numbered lines, and said second differance signal being present while said first differance signal is absent during even-numbered lines; said system comprising:

first means operative to receive said three primary signals and to generate said luminance signal on carrier and said two differance signals; and second means operative to receive said two differance signals and said luminance signal and to generate said chrominance signal, said second means being further operative to provide phase angle separation between said two amplitude modulated differance signals and to effect surpression of each of said two amplitude modulated signals singly and simultaneously, and to combine said luminance and chrominance signals.

18. A color television system operative to provide a composite television signal from a composite NTSC signal; said composite television signal being made up of a luminance signal on a carrier and a chrominance signal; said chrominance signal being made up of two differance signals amplitude modulated on a sub-carrier with respect to two mutually perpendicular axes and a constant amplitude reference color burst at the frequency of the sub-carrier, said two differance signals being absent at the start of every second line when said color burst is present, the first of said differance signals being present while the second of said two differance signals is absent during odd-numbered lines, and said second differance signal being present while said first differance signal is absent during even-numbered lines, said system comprising:

first means operative to receive said composite NTSC signal and to generate said chrominance signal; and second means operative to combine said composite NTSC signal with said chrominance signal to provide said composite television signal.

19. An adaptor for a color television system operative to work on a composite television signal; said composite signal being made up of a luminance signal on a carrier and a chrominance signal; said chrominance signal being made up of two differance signals amplitude modulated on a sub-carrier with respect to two mutually perpendicular axes and a constant amplitude reference color burst at the frequency of the sub-carrier, said two differance signals being absent at the start of every second line when said color burst is present, the first of said differance signals being present while the second of said two differance signals is absent during odd-numbered lines, said second differance signal being present while said first differance signal is absent during even-numbered lines; said adaptor comprising:

first means operative to receive said chrominance signal and to effect a time delay between said amplitude modulated differance signals; and second means to combine said two amplitude modulated difference signals so that both of said two amplitude modulated differance signals which are transmitted on alternate lines are present during each line.

* * * * *